(12) United States Patent
Yoshikawa et al.

(10) Patent No.: US 8,310,982 B2
(45) Date of Patent: Nov. 13, 2012

(54) WIRELESS COMMUNICATION DEVICE AND WIRELESS COMMUNICATION METHOD

(75) Inventors: Mitsumasa Yoshikawa, Yokohama (JP); Yoshikazu Motomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 12/562,719

(22) Filed: Sep. 18, 2009

(65) Prior Publication Data

US 2010/0008335 A1    Jan. 14, 2010

Related U.S. Application Data

(63) Continuation of application No. PCT/JP2007/055710, filed on Mar. 20, 2007.

(51) Int. Cl.
*H04B 7/212* (2006.01)
(52) U.S. Cl. ......... 370/322; 370/326; 370/337; 370/347
(58) Field of Classification Search .................. 370/321, 370/322, 326, 337, 347
See application file for complete search history.

(56) References Cited

U.S. PATENT DOCUMENTS

| | | |
|---|---|---|
| 2005/0207370 A1 | 9/2005 | Harada |
| 2006/0203790 A1* | 9/2006 | Hong et al. .................. 370/338 |
| 2006/0268931 A1* | 11/2006 | Sella .............................. 370/468 |
| 2007/0038784 A1* | 2/2007 | Sung et al. ....................... 710/56 |
| 2007/0070966 A1* | 3/2007 | Sung et al. ..................... 370/338 |
| 2007/0086421 A1* | 4/2007 | Hong et al. .................... 370/349 |
| 2007/0283018 A1* | 12/2007 | Yun .............................. 709/226 |

FOREIGN PATENT DOCUMENTS

JP    2005-252980    9/2005

OTHER PUBLICATIONS

International Search Report for PCT/JP2007/055710, mailed Jun. 5, 2007.
English Translation of the International Preliminary Report on Patentability mailed Oct. 1, 2009 in corresponding International Patent Application PCT/JP2007/055710.
Patent Abstracts of Japan, Publication No. 2002-016968, published date. Jan. 18, 2002.
Patent Abstracts of Japan, Publication No. 2003-218785, published date. Jul. 31, 2003.
"Wireless Universal Serial Bus Specification", Revision 1.0, Released May 12, 2005.

* cited by examiner

*Primary Examiner* — Bo Hui A Zhu
(74) *Attorney, Agent, or Firm* — Fujitsu Patent Center

(57) ABSTRACT

As a first slot transmitting notification from an electronic device to a host device, a second slot transmitting a coupling request and a third slot transmitting notification except the coupling request are provided, and whether or not to provide the second slot may be controlled. Accordingly, it makes it possible to control a period when the second slot is provided, namely a period when the coupling request is performed, prevent the host device and the electronic device from being coupled erroneously by the unintended coupling request, and couple the host device being a communication object and the electronic device appropriately.

15 Claims, 7 Drawing Sheets

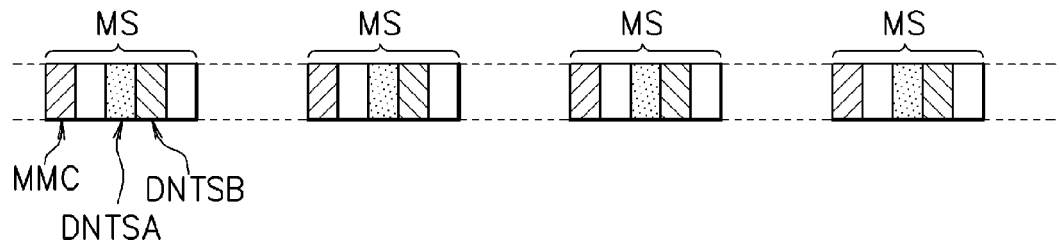
F I G. 3A
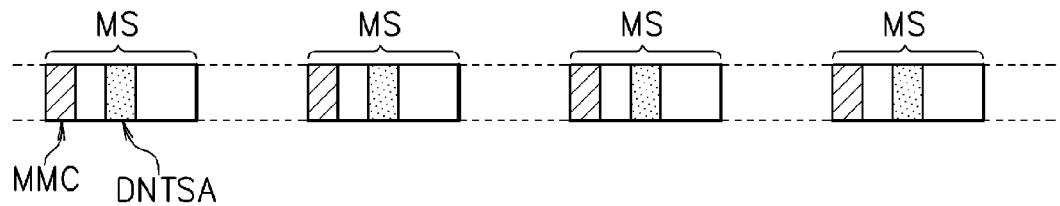
F I G. 3B
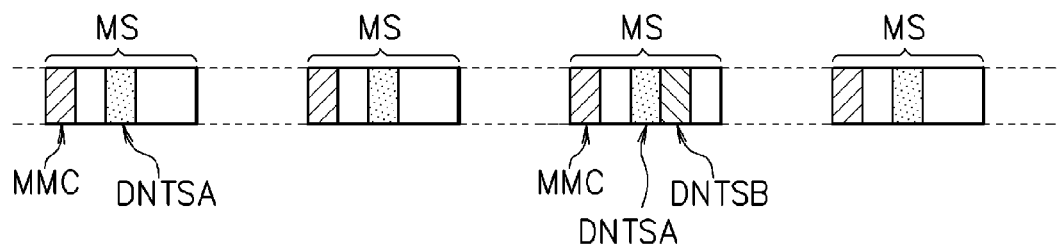
F I G. 3C
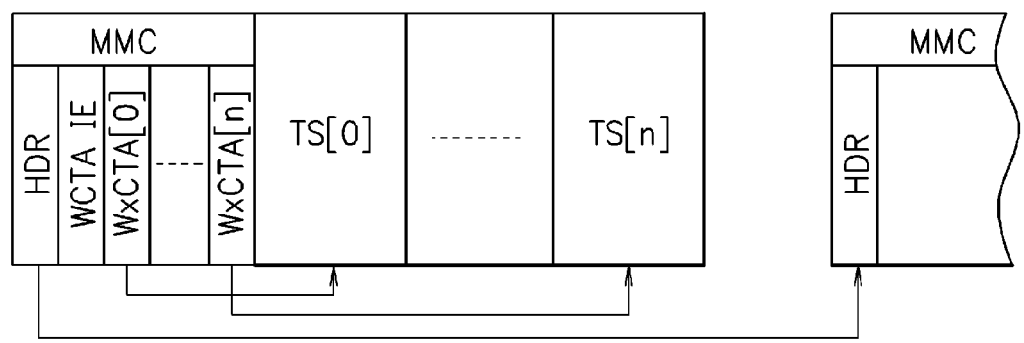
F I G. 4

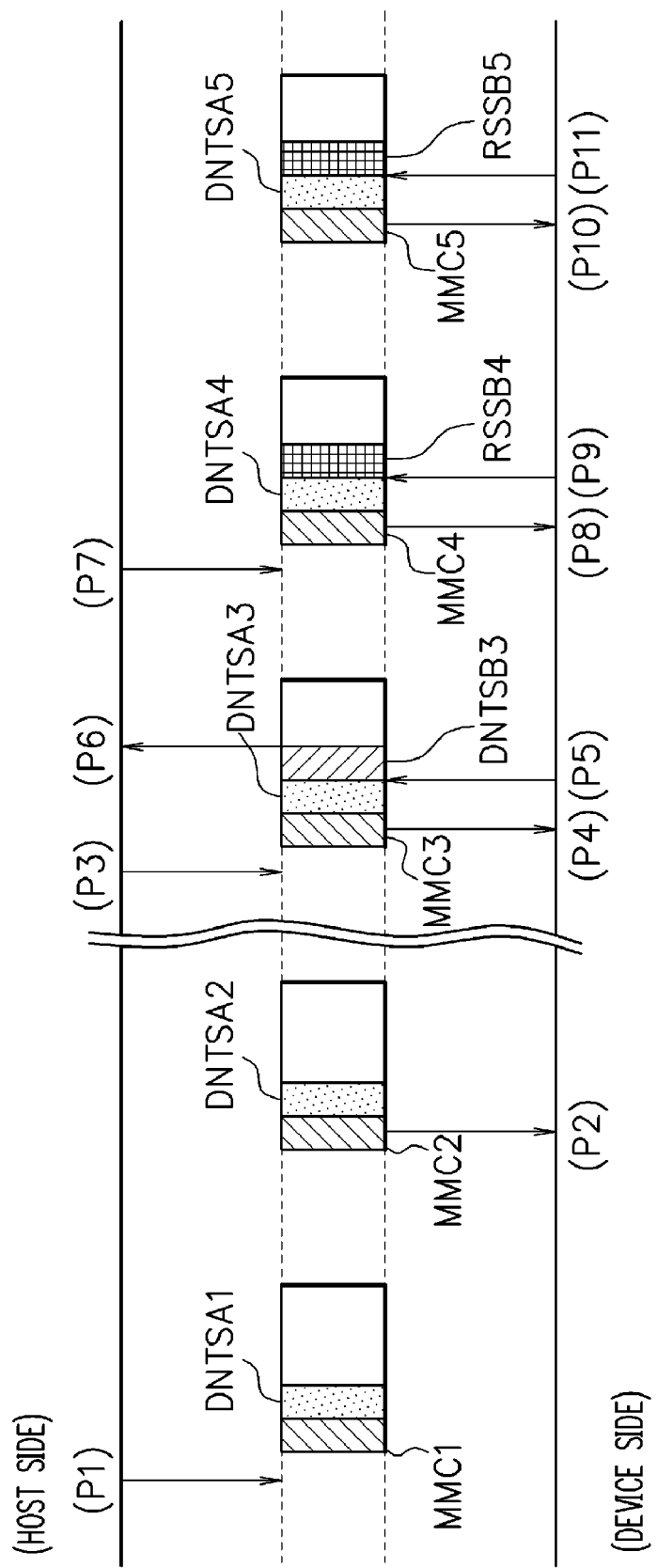

F I G. 10A
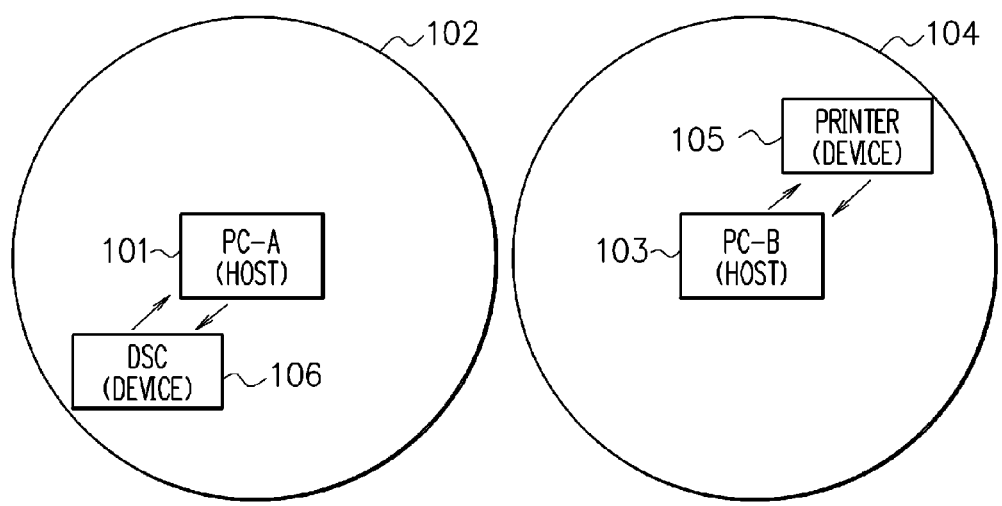
F I G. 10B
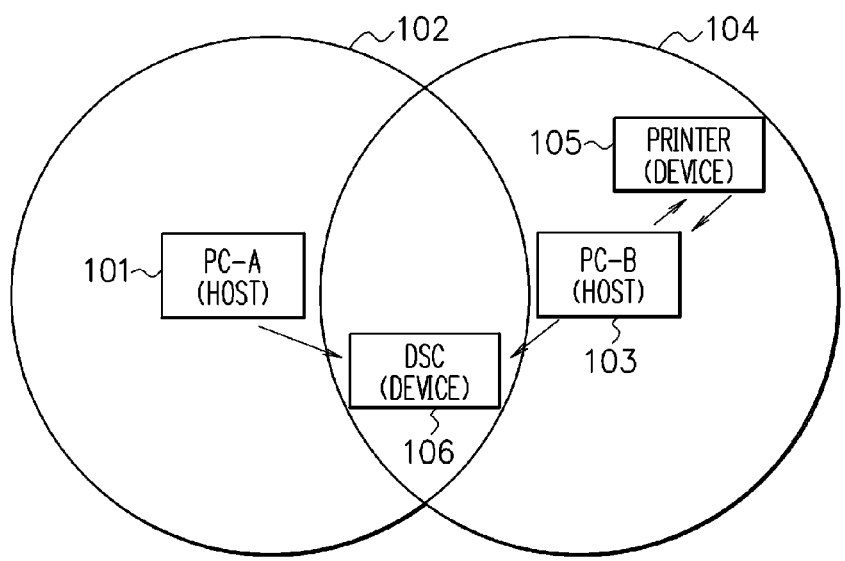

WIRELESS COMMUNICATION DEVICE AND WIRELESS COMMUNICATION METHOD

CROSS REFERENCE TO THE RELATED APPLICATIONS

This application is a continuation application of International Application No. PCT/JP2007/055710, filed on Mar. 20, 2007, and designating the U.S., the entire contents of which are incorporated herein by reference.

FIELD

The present embodiments discussed herein relates to wireless communication devices and a wireless communication method.

BACKGROUND

In the case when data communication is performed in a wired USB (Universal Serial Bus) system, a user needs to connect an electronic device (hereinafter, which will be called a device) to a host device being a communication object. For example, in the case when image data stored in a digital camera being the device is copied in a computer being the host device, the digital camera is coupled to the computer being a communication object through a USB cable.

The above is the similar in the case when data communication is performed in a wireless USB system as well. Here, a wireless USB is one of standards in high-speed short-range wireless communication, and a specification thereof is disclosed in a wireless USB specification (refer to Non Patent Document 1).

In the wireless USB system, communication is performed at a time division multiple access (TDMA) method, and the host device manages wireless USB channels linked by a time slot scheduling management command (Micro-scheduled Management Command: MMC). The host device allocates a slot (a time slot) in a time division manner thereby performing communication with the coupled device. Information with regard to the slot (an attribute, time and the like) is described in the MMC.

Further, in the wireless USB system, in order to realize device side-led processing, the host device allocates a device notification slot (Device Notification Time Slot: DNTS) in the wireless USB channel. The device side-led processing includes connecting the device, cutting the coupling, shifting to a reduced power mode, or the like. The device notifies the host device of a message matching each processing matter by the allocated device notification slot, and thereby coupling of the device, cutting the coupling, or the like is realized.

In the case when data communication is performed by using the wireless USB system in a home, or the like, there are many cases when an environment in a home or the like is a single host environment where one computer exists as the host device. Therefore, although a user is in particular not aware of connecting the device to the host device being a communication object, the device and the host device being a communication object are coupled appropriately.

However, under a multi-host environment where a computer as the host device exists in a narrow range plurally such as an office environment, there is a possibility that the device and the host device are coupled erroneously. It is considered that, for example, as long as the device is capable of receiving radio waves from another host device not being a communication object even when a user moves the device near by the host device being a communication object, the device transmits a coupling request to the host device not being a communication object thereby being coupled thereto.

The host device provides the device notification slot periodically. A user moves the device to the periphery of the host device (within a communication range formed by wireless radio waves that the host device transmits), and thereby the device may detect the device notification slot that the host device provides. Then, the device transmits the coupling request to the host device by the detected device notification slot, and thereby the device and the host device are coupled without performing a coupling setting and the like particular to a user.

There will be considered a case when a communication range (a communicable range) 102 formed by wireless radio waves that a computer (PC-A) 101 being the host device transmits and a communication range 104 formed by wireless radio waves that a computer (PC-B) 103 being the host device transmits do not overlap with each other as depicted in FIG. 10A. It is set to be in a state where the communication ranges 102 and 104 formed by the wireless radio waves from each of the host devices 101 and 103 do not have a region overlapped with the communication range of the adjacent host device, namely in a state corresponding to the single host environment.

Each of the host devices 101 and 103 provides the device notification slot periodically. A digital still camera (DSC) 106 being the device is located within the communication range 102 therefore being able to detect the device notification slot that the host device 101 provides and perform the coupling request and the like to the host device 101. On the other hand, the device 106 is located outside the communication range 104 therefore not detecting the device notification slot that the host device 103 provides.

Similarly, a printer 105 being the device is located within the communication range 104 therefore being able to detect the device notification slot that the host device 103 provides and perform the coupling request and the like to the host device 103. On the other hand, the device 105 is located outside the communication range 102 therefore not detecting the device notification slot that the host device 101 provides.

On the contrary, as depicted in FIG. 10B, under the environment (the multi-host environment) where the communication ranges 102 and 104 formed by the wireless radio waves from the adjacent host devices 101 and 103 overlap at least one portion, when the device 106 is moved to the region overlapped with the communication ranges 102 and 104, the device 106 may detect the device notification slots from both of the host devices 101 and 103. Accordingly, the device 106 may perform the coupling request and the like to both of the host devices 101 and 103.

In order to connect the device to the targeted host device being a communication object under the multi-host environment where the plural host devices exist in a narrow range, there has been suggested a device in which a narrow region range is set as a communication range formed by wireless radio waves from the host device by using a plurality of directional antennas, and thereby one portable device is indicated from a large number of portable devices existing around the host device to establish coupling with the host device (refer to, for example, Patent Document 1).

Further, there has been suggested a device in which when an inquiry signal is transmitted by varying transmission power in stages and a response signal corresponding to the inquiry signal is received from a partner device, the partner device establishing communication may be selected easily so as to display a list of the partner device (refer to, for example, Patent Document 2).

Patent Document 1: Japanese Patent Application Laid-open No. 2002-16968

Patent Document 2: Japanese Patent Application Laid-open No. 2003-218785

Non Patent Document 1: Wireless Universal SerialBus Specification, Revision 1.0 released May 12, 2005

SUMMARY

According to an aspect of the embodiments, a wireless communication device allocating a slot that indicates a given communication period in a time division manner and transmitting slot allocation information in which allocation of the slot is defined, the wireless communication device includes a first slot that transmits notification from an electronic device to the wireless communication device including a second slot transmitting a coupling request and a third slot transmitting notification except the coupling request, and a controller controlling whether or not to provide the second slot.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3A is a view depicting one example of generation and allocation of slots in the embodiment;

FIG. 3B is a view depicting one example of generation and allocation of slots in the embodiment;

FIG. 3C is a view depicting one example of generation and allocation of slots in the embodiment;

FIG. 4 is a view depicting an overview of a constitution of an MMC;

FIG. 9 is a view depicting one example of generation and allocation of slots corresponding to the coupling sequence depicted in FIG. 8;

FIG. 10A is a view depicting a structure example of a wireless communication system corresponding to a single host environment; and FIG. 10B is a view depicting a structure example of a wireless communication system under a multi-host environment.

DESCRIPTION OF EMBODIMENTS

Hereinafter, an embodiment will be explained based on the drawings.

Figure 1:
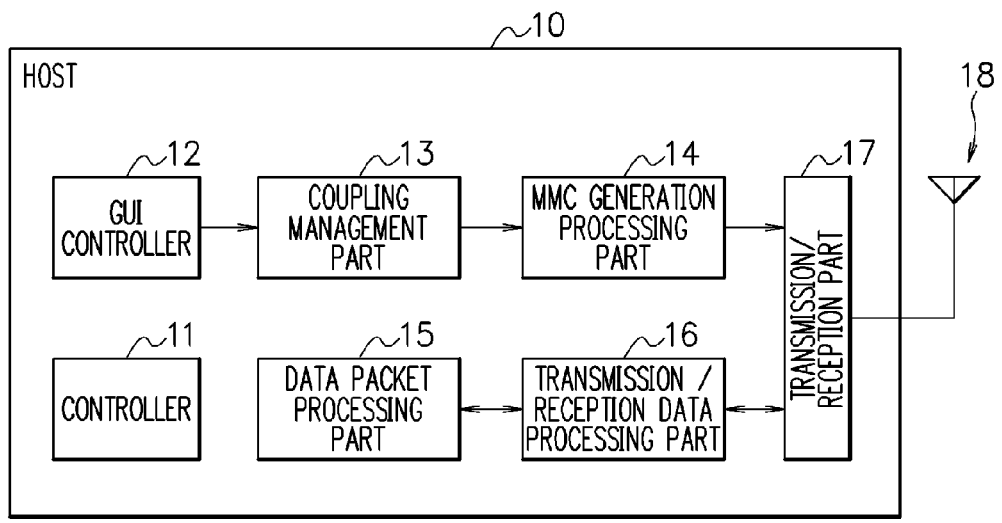
FIG. 1 is a diagram depicting a configuration example of a wireless communication device (a host device) in one embodiment.
Figure 2:
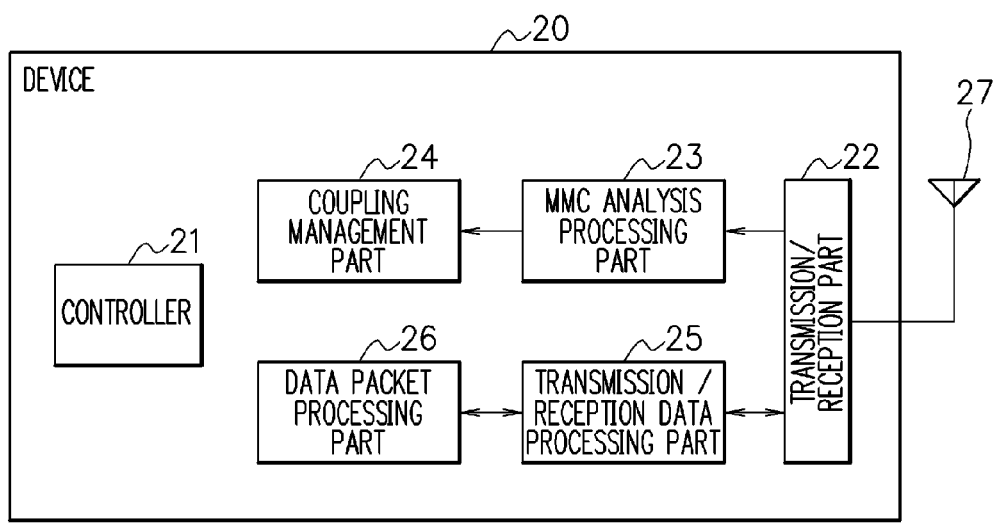
FIG. 2 is a diagram depicting a configuration example of a wireless communication device (a device) in one embodiment.

FIG. 1 is a block diagram depicting a configuration example of a wireless communication device (a host device) 10 in one embodiment, and FIG. 2 is a block diagram depicting a configuration example of a wireless communication device (a device) 20 in one embodiment. The host device 10 depicted in FIG. 1 and the device 20 depicted in FIG. 2 perform communication at a time division multiple access method (a TDMA method) by using wireless radio waves. The embodiment is set that communication is performed at a communication method in conformity with a wireless USB standard as one example, but, the embodiment is not limited to the example, and it may be such that communication is performed at a communication method in conformity with, for example, Bluetooth.

As depicted in FIG. 1, the host device 10 has a controller 11, a GUI (Graphic User Interface) controller 12, a coupling management part 13, an MMC (Micro-Scheduled Management Command) generation processing part 14, a data packet processing part 15, a transmission/reception data processing part 16, a transmission/reception part 17, and an antenna 18.

The controller 11 controls each of function parts 12 to 17 in the host device 10 in an integrated manner. The GUI controller 12 performs control related to a GUI for performing various kinds of settings, and the like. The coupling management part 13 manages a coupling state of the external device to the host device 10, and the like in accordance with a control result performed in the GUI controller 12. The coupling management part 13 manages whether or not the host device 10 and the device are coupled, and performs control related to authentication processing in coupling and the like.

The MMC generation processing part 14 time-divides a wireless USB channel into slots, and performs generation and allocation of slots based on coupling control information from the coupling management part 13. The MMC generation processing part 14 performs generation and allocation of slots in accordance with a processing flow depicted in FIG. 5 as will be described later.

Further, the MMC generation processing part 14 generates an MMC (a time slot scheduling management command) including slot allocation information in which allocation of a slot is defined. The coupling control information from the coupling management part 13 includes information related to an environment setting in the host device 10, information related to a coupling instruction, coupling information of the device, and so on.

The data packet processing part 15 performs processing related to a data packet transmitted/received to/from the coupled device. The transmission/reception data processing part 16 executes various kinds of processing for transmitting/receiving data to/from the coupled device to perform data transmission/reception. The transmission/reception part 17 is to transmit the MMC and transmit/receive data to/from the device via the antenna 18 by the wireless radio waves.

Further, as depicted in FIG. 2, the device 20 has a controller 21, a transmission/reception part 22, an MMC analysis processing part 23, a coupling management part 24, a transmission/reception data processing part 25, a data packet processing part 26, and an antenna 27.

The controller 21 controls each of function parts 22 to 26 in the device 20 in an integrated manner. The transmission/reception part 22 is to receive the MMC and transmit/receive data to/from the host device 10 via the antenna 27 by the wireless radio waves.

Figure 7:
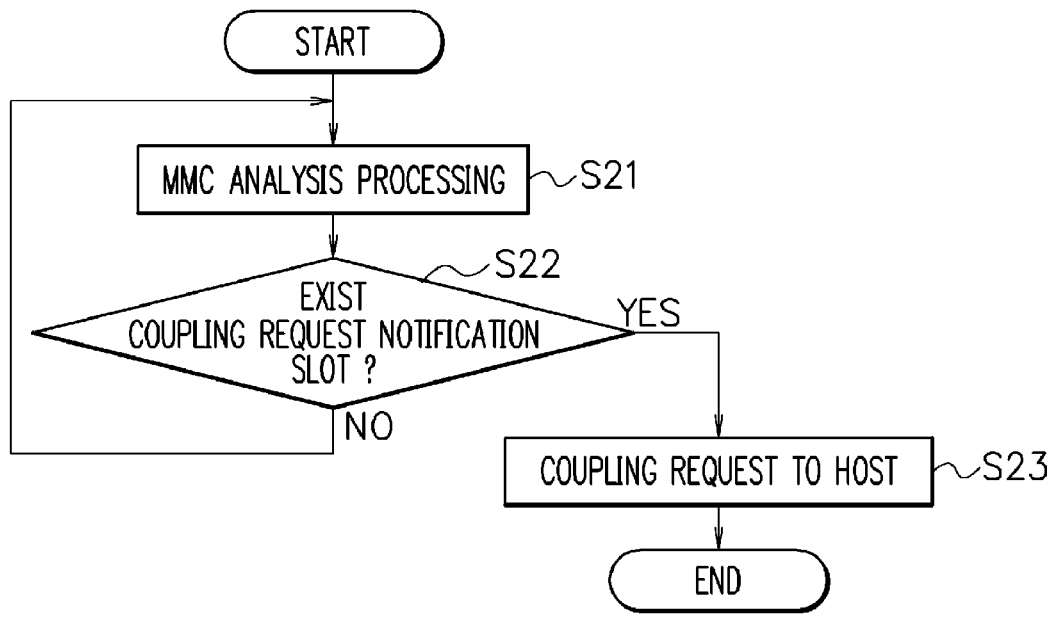
FIG. 7 is a flowchart depicting coupling processing for transmitting a coupling request in the embodiment.

The MMC analysis processing part 23 analyzes the received MMC to identify slot allocation. Further, as depicted in FIG. 7, which will be described later, in the case when the device 20 requires the host device 10 to connect thereto, the MMC analysis processing part 23 analyzes the received MMC to determine whether or not a coupling request notification slot for transmitting a coupling request exists. As a result of the determination, in the case when the coupling request notification slot exists, the coupling request to the host device 10 is performed by using the coupling request notification slot. The coupling management part 24 manages a coupling state to the host device 10 and the like.

The data packet processing part 26 performs processing related to a data packet transmitted/received to/from the coupled host device 10. The transmission/reception data processing part 25 executes various kinds of processing for transmitting/receiving data to/from the coupled host device to perform data transmission/reception.

FIG. 3A, FIG. 3B, and FIG. 3C are views depicting examples of generation and allocation of slots in the embodiment. The host device 10 in the embodiment performs generation and allocation of slots as depicted in FIG. 3A, FIG. 3B, and FIG. 3C in accordance with a state, a setting, and so on. The host device 10 performs generation and allocation of slots in accordance with, for example, setting information of the environment setting, presence/absence of the coupling instruction, and the coupling information to the device.

In FIG. 3A to FIG. 3C, each wireless USB channel MS (Micro-scheduled sequence) is constituted by the MMC and one or more slots (one or more time slots). The MMC includes a header, an ID, and the slot allocation information. Further, the slot allocation information is constituted by information (an attribute, time, and so on) with regard to the slot in each allocated slot.

Slots DNTSA and DNTSB are device notification slots for transmitting a message from the device 20 to the host device 10 in order to realize device 20 side-led processing. The slot DNTSA is a post-coupling processing notification slot (a post-coupling event slot) for transmitting a message such as, for example, cut-off or a shift to a reduced power mode except the coupling request. The slot DNTSB is a coupling request notification slot (a coupling slot) for transmitting the coupling request.

Note that the MMC and the slots DNTSA and DNTSB are depicted in FIG. 3A to FIG. 3C, and other slots are not depicted therein, but, a slot for transmitting/receiving data between the host device 10 and the device 20 is allocated when necessary, for example.

FIG. 3A depicts the example where both of the post-coupling processing notification slot DNTSA and the coupling request notification slot DNTSB are allocated periodically as the device notification slot. In FIG. 3A, the post-coupling processing notification slot DNTSA and the coupling request notification slot DNTSB are allocated to each wireless USB channel MS.

For example, in the case when the environment setting set in the host device 10 is a single host environment, generation and allocation of slots as depicted in FIG. 3A are performed. Here, the single host environment corresponds to a system environment where the single host device 10 exists as the host device connecting to the device 20 (for example, a general home or the like).

As depicted in FIG. 3A, in the case when providing the coupling request notification slot DNTSB periodically, a user moves the device 20 near by the host device 10 being a communication object (within a communication range formed by the wireless radio waves) thereby allowing the device 20 to detect the coupling request notification slot DNTSB and transmit the coupling request by the coupling request notification slot DNTSB. Accordingly, without execution of a particular coupling setting by a user being necessary, the coupling request to the host device 10 may be performed, and coupling whose operability is improved may become possible.

FIG. 3B depicts the example where the post-coupling processing notification slot DNTSA is allocated periodically as the device notification slot. In FIG. 3B, the coupling request notification slot DNTSB is not allocated but the post-coupling processing notification slot DNTSA is allocated to each wireless USB channel MS.

For example, in the case when the environment setting set in the host device 10 is a multi-host environment, generation and allocation of slots as depicted in FIG. 3B are performed. Here, the multi-host environment corresponds to a system environment where the host devices that other users or the like use exist in a narrow range (for example, an office or the like), in other words, a system environment where the host device capable of connecting to the device 20 exists plurally.

As depicted in FIG. 3B, in the case when not providing the coupling request notification slot DNTSB, although a user moves the device 20 near by the host device 10 (within the communication range formed by the wireless radio waves), the device 20 does not detect the coupling request notification slot DNTSB therefore not transmitting the coupling request. Accordingly, for example, in the case when a new device is not allowed to be coupled to the host device, as depicted in FIG. 3B, the coupling request notification slot DNTSB is not provided, and thereby it may become possible to prevent the device and the host device from being coupled erroneously. Note that the device being coupled to the host device already by using the post-coupling processing notification slot DNTSA operates.

FIG. 3C depicts the example where the post-coupling processing notification slot DNTSA is allocated periodically and the coupling request notification slot DNTSB is allocated temporarily as the device notification slot. As depicted in FIG. 3C, there exist the wireless USB channel MS to which both of the post-coupling processing notification slot DNTSA and the coupling request notification slot DNTSB are allocated and the wireless USB channel MS to which the post-coupling processing notification slot DNTSA is allocated.

For example, in the case when the environment setting set in the host device 10 is the multi-host environment and the coupling instruction is input by a user, generation and allocation of slots as depicted in FIG. 3C are performed.

As depicted in FIG. 3C, when normally the coupling request notification slot DNTSB is not provided but the coupling instruction is input for coupling the device, in the case when the coupling request notification slot DNTSB is provided temporarily, it may become possible to prevent the device and the host device from being coupled erroneously during a normal period when the coupling request notification slot DNTSB is not provided.

Further, the coupling request notification slot DNTSB is provided temporarily, and thereby the device 20 transmits the coupling request to the host device 10 by the coupling request notification slot DNTSB provided temporarily. Therefore, a wireless medium may be used effectively.

Note that it is assumed that providing the coupling request notification slot DNTSB temporarily makes the unintended peripheral device detect the coupling request notification slot DNTSB to perform the coupling request, but the coupling request from the peripheral device is transmitted to the host device that provides the coupling request notification slot DNTSB temporarily. Therefore, it does not affect the host devices that other users use.

Further, FIG. 3C depicts the example where both of the post-coupling processing notification slot DNTSA and the coupling request notification slot DNTSB are allocated to the single wireless USB channel MS, and the post-coupling processing notification slot DNTSA is allocated to another wireless USB channel MS, but the embodiment is not limited to the example.

For example, after the coupling instruction is input by a user, the coupling request notification slot DNTSB may be allocated periodically during a given period, or the coupling request notification slot DNTSB may be allocated to a given number of wireless USB channels MS. Further, it may be such that coupling completion notification is performed after the device is coupled, and the coupling request notification slot DNTSB is allocated periodically during a period until the coupling completion notification is performed after the coupling instruction is input by a user.

FIG. 4 is a view depicting an overview of the constitution of the MMC. The MMC has the header (HDR) including information indicating the subsequent MMC, the ID (WCTA IE), and the slot allocation information (WxCTA).

The slot allocation information (WxCTA: Wireless x Channel Time Allocation), in each allocated slot, indicates an attribute thereof and a start time, and the like. The slot allocation information (WxCTA) corresponding to the number of allocated slots is written in the MMC, and the example depicted in FIG. 4 is set that the slot allocation information (WxCTA [0]) corresponds to the slot (TS [0]) and the slot allocation information (WxCTA [n]) corresponds to the slot (TS [n]).

In a conventional wireless USB specification, an attribute field (bmAttributes) in the slot allocation information (WxCTA) is configured by 8 bits, and a use of the slot is defined by bmAttributes [7:6], and various kinds of information in accordance with the use is defined by bmAttributes [5:0].

For example, in the case of a data slot (a data reception slot) for transmitting data in the direction from the host device to the device, a value of bmAttributes [7:6] is "00B" (indicating that B is binary data), and in the case of a data slot (a data transmission slot) for transmitting data in the direction from the device to the host device, the value of bmAttributes [7:6] is "01B". Further, in the case of the device notification slot for notifying a message in the direction from the device to the host device, the value of bmAttributes [7:6] is "10B".

In the embodiment, as the device notification slot, the coupling request notification slot for transmitting the coupling request and the post-coupling processing notification slot for transmitting a massage except the coupling request are provided.

Thus, the embodiment may be configured such that the coupling request notification slot and the post-coupling processing notification slot may be identified by bmAttributes [7:6]. For example, the slot corresponding to a conventional device notification slot indicated by which the value of bmAttributes [7:6] is "10B" may be defined as the post-coupling processing notification slot in the embodiment, and the slot indicated by which the value of bmAttributes [7:6] is "11B" may be defined as the coupling request notification slot in the embodiment.

Further, for example, the slot allocation information in the conventional device notification slot is indicated such that "000000B" is set in bmAttributes [5:0] and it is to be ignored on the device side, and thereby it may also be such that the coupling request notification slot and the post-coupling processing notification slot may be identified by using bmAttributes [5:0].

Next, there will be explained operations in the host device 10 and the device 20 in the embodiment. Note that, hereinafter, processing related to provision of the device notification slots (the coupling request notification slot and the post-coupling processing notification slot) and the coupling request will be explained. Data transmission/reception between the host device and the device after they are coupled is the similar to the conventional data transmission/reception, and therefore, an explanation thereof will be omitted.

Firstly, the operation in the host device 10 will be explained.

Figure 5:
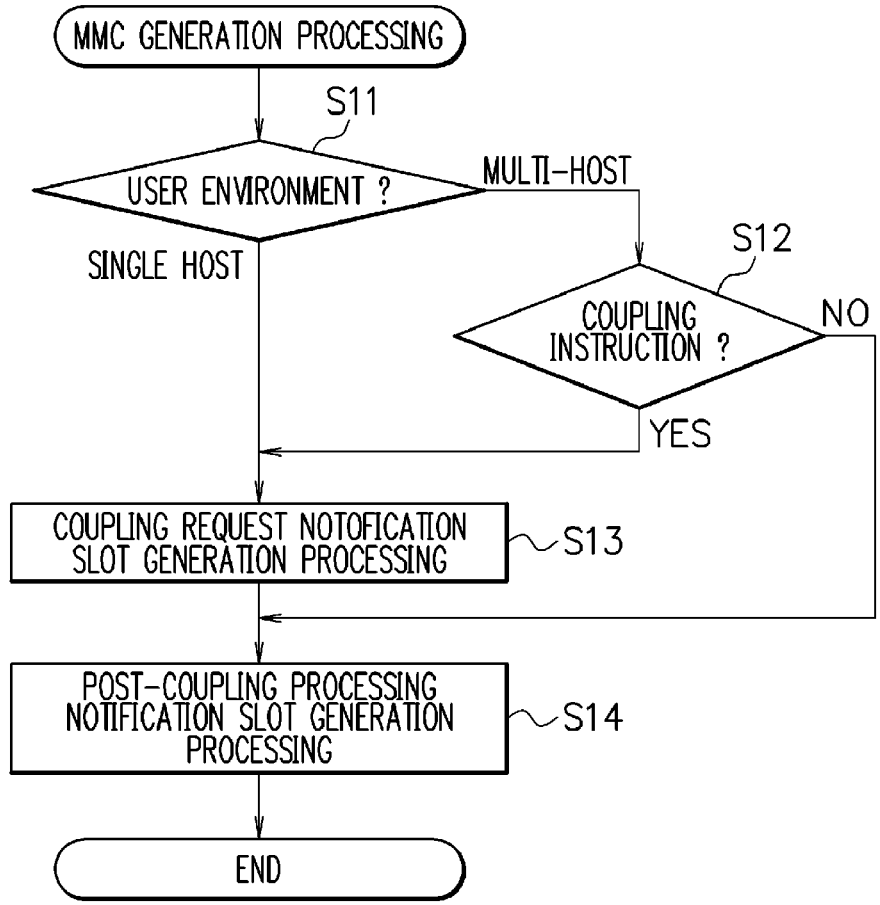
FIG. 5 is a flowchart depicting MMC generation processing in the embodiment.

FIG. 5 is a flowchart depicting MMC generation processing performing generation and allocation of slots in the host device 10.

Firstly, at step S11, the MMC generation processing part 14 determines whether the environment setting set by a user is the single host environment or the multi-host environment based on the coupling control information from the coupling management part 13.

Figure 6A:
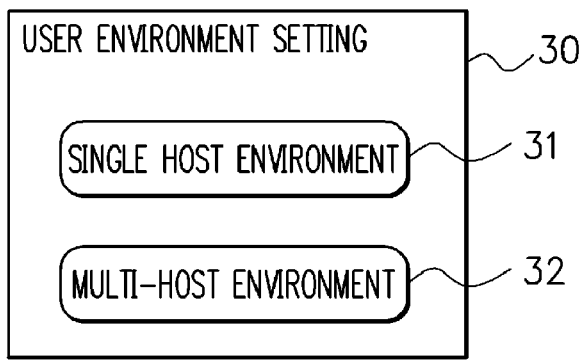
FIG. 6A is a view depicting one example of a user environment setting screen.

The setting of the environment setting performed by a user is set to be performed by using, for example, a user environment setting screen 30 depicted in FIG. 6A as one example. The user environment setting screen 30 depicted in FIG. 6A is displayed on a not-depicted display part on the host device 10 side based on control in the GUI controller 12. In accordance with under which environment is the host device 10 used, a user inputs either a single host environment button 31 or a multi-host environment button 32 on the user environment setting screen 30 in a selectable manner, and thereby the environment setting is performed and information thereof is supplied to the coupling management part 13.

Here, the single host environment button 31 is selected in the case of the system environment where the host device 10 exists as the host device to be coupled. The multi-host environment button 32 is selected in the case of the system environment where the host devices that other users or the like use exist in a narrow range.

Figure 6B:
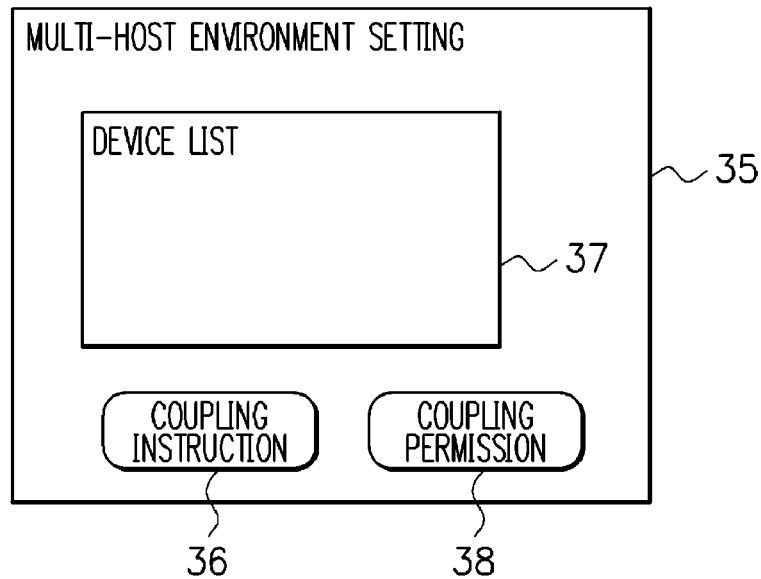
FIG. 6B is a view depicting one example of a multi-host environment setting screen.

As a result of determination at step S11, in the case when the environment setting is determined to be the multi-host environment, at step S12, the MMC generation processing part 14 determines whether or not the coupling instruction is input by a user. Here, the input of the coupling instruction by a user is performed by using, for example, a multi-host environment setting screen 35 depicted in FIG. 6B as one example. The multi-host environment setting screen 35 depicted in FIG. 6B is displayed on the not-depicted display part on the host device 10 side based on control in the GUI controller 12.

There are provided a coupling instruction button 36 for inputting the coupling instruction, a device list display region 37 for list-displaying the device that transmits the coupling request, and a coupling permission button 38 for selecting the targeted device from the list-displayed devices to be coupled on the multi-host environment setting screen 35. In the case when the environment setting is the multi-host environment and the device is desired to be coupled to the host device 10, a user presses the coupling instruction button 36 by using a not-depicted input part, and thereby the coupling instruction is input.

In the case when the environment setting is determined to be the single host environment at step S11, or in the case when it is determined that the environment setting is the multi-host environment at step S11 and the coupling instruction is input at step S12, at step S13, the MMC generation processing part 14 performs coupling request notification slot generation processing generating the coupling request notification slot and its slot allocation information. Subsequently, at step S14, the MMC generation processing part 14 performs post-coupling processing notification slot generation processing generating the post-coupling processing notification slot and its slot allocation information then ends the MMC generation processing.

Further, in the case when it is determined that the environment setting is the multi-host environment at step S11 and the coupling instruction is not input at step S12, at step S14, the MMC generation processing part 14 performs the post-coupling processing notification slot generation processing generating the post-coupling processing notification slot and its slot allocation information then ends the MMC generation processing.

Then, the slot allocation information generated in the MMC generation processing is transmitted via the transmission/reception part 17 and the antenna 18, and communication with the device is performed by using the allocated slot.

As described above, in the case when the environment setting set by a user is the single host environment, there is no fear of erroneous coupling, and therefore, the coupling request notification slot and the post-coupling processing notification slot are generated to perform allocation of the coupling request notification slot and the post-coupling processing notification slot periodically as depicted in FIG. 3A.

Further, in the case when the environment setting set by a user is the multi-host environment, in order to prevent erroneous coupling and use the wireless medium effectively, normally, the post-coupling processing notification slot is generated to perform allocation of the post-coupling processing notification slot as depicted in FIG. 3B.

However, in the case when the environment setting is the multi-host environment, and the coupling instruction is input by a user, in addition to the post-coupling processing notification slot, the coupling request notification slot is generated, and as depicted in FIG. 3C, allocation of the coupling request notification slot is performed temporarily to provide it. When the coupling request in which the coupling request notification slot is used from the device is received, the device that performs the coupling request is list-displayed in the device list display region 37 on the multi-host environment setting screen 35. A user selects the device to connect to the host device 10 from the devices displayed in the device list display region 37 to press the coupling permission button 38 by using the not-depicted input part, and thereby the selected device and the host device 10 are coupled.

Next, the operation in the device 20 will be explained.

The device 20, in order to couple to the host device, needs to detect the coupling request notification slot and transmit the coupling request to the host device by using the detected coupling request notification slot. Note that, unlike the host device, the environment setting performed by a user is not necessary in the device 20.

FIG. 7 is a flowchart depicting coupling processing in order that the device 20 transmits the coupling request to the host device.

At step S21, the MMC analysis processing part 23 analyzes the MMC received from the host device via the antenna 27 and the transmission/reception part 22. Concretely, the MMC analysis processing part 23 analyzes the slot allocation information of the received MMC to recognize slot allocation in the channel.

Next, at step S22, the MMC analysis processing part 23 determines whether or not the coupling request notification slot in the channel exists based on an analysis result at step S21. As a result, in the case when it is determined that the coupling request notification slot does not exist in the channel, the coupling processing returns to step S21.

On the other hand, as a result of determination at step S22, in the case when it is determined that the coupling request notification slot exists in the channel, at step S23, the device 20 transmits the coupling request to the host device by using the coupling request notification slot.

Figure 8:
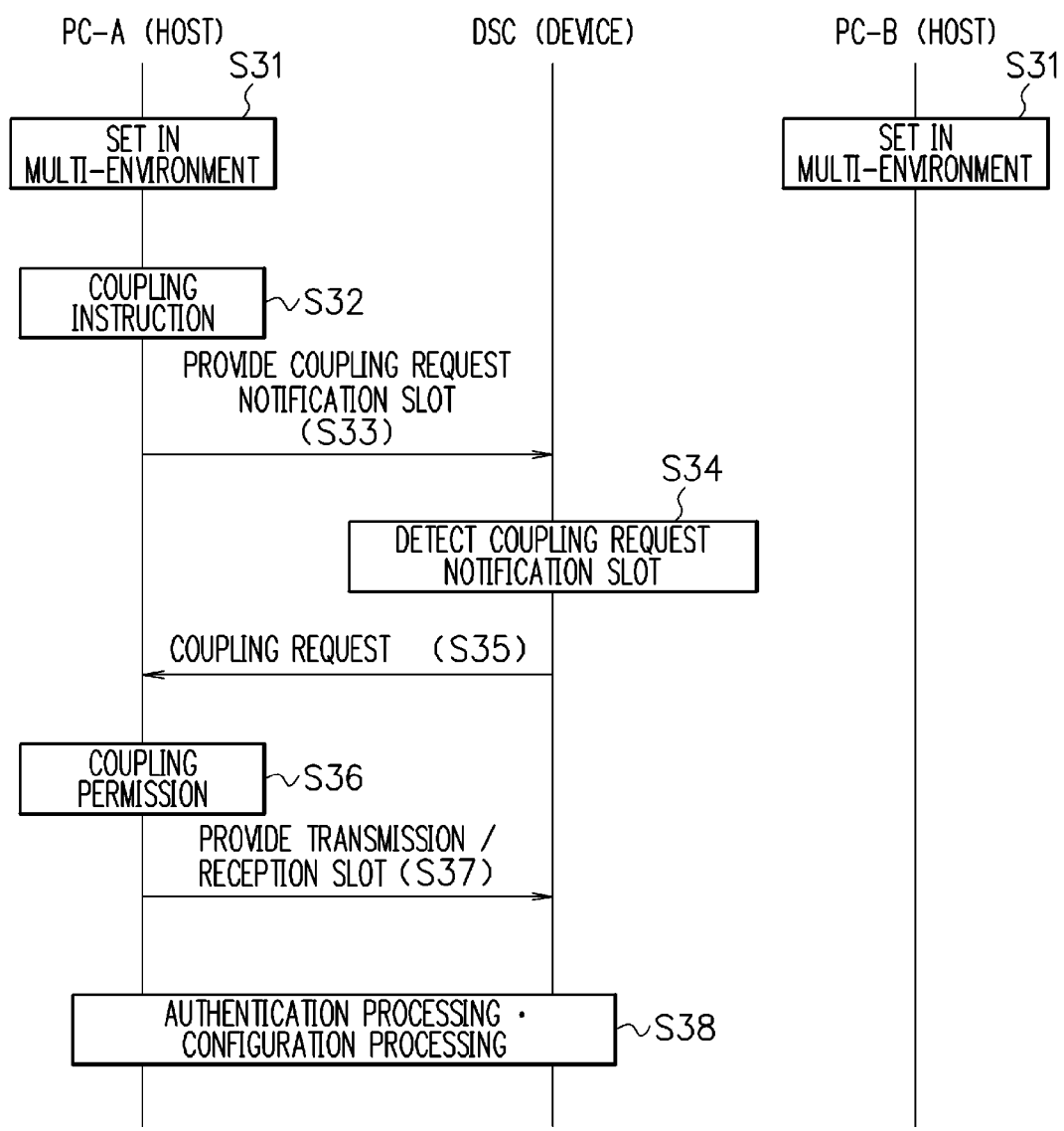
FIG. 8 is a view depicting a concrete example of a coupling sequence between the host device and the device in the embodiment.

Next, under the environment where respective communication ranges 102 and 104 formed by wireless radio waves from a computer (PC-A) 101 and a computer (PC-B) 103 being the host devices as depicted in FIG. 10B overlap with each other at least one portion, there will be explained a concrete coupling example in which the PC-A 101 and a digital still camera (DSC) 106 being the device are coupled with reference to FIG. 8 and FIG. 9.

Firstly, the multi-host environment is previously set as the environment setting by each of users using the PC-A 101 and the PC-B 103 (S31, P1). In this state, the PC-A 101 does not perform generation and allocation of the coupling request notification slot, and therefore, as depicted in FIG. 9, post-coupling processing notification slots DNTSA1 and DNTSA2 are allocated. Accordingly, even when the DSC 106 is moved within the communication range 102 of the PC-A 101 and the DSC 106 analyzes the slot allocation information in an MMC1 and an MMC2 provided from the PC-A 101, the coupling request notification slot is not detected, so that the coupling request is not performed (P2). The similar is applied even within the communication range 104 of the PC-B 103.

Next, in the PC-A 101, when the coupling instruction button 36 on the multi-host environment setting screen 35 depicted in FIG. 6B is pressed by a user's input operation (S32, P3), the PC-A 101 performs generation and allocation of the coupling request notification slot, in addition to the post-coupling processing notification slot. Accordingly, as depicted in FIG. 9, a post-coupling processing notification slot DNTSA3 and a coupling request notification slot DNTSB3 are provided from the PC-A 101 (S33).

When the DSC 106 is located within the communication range 102 of the PC-A 101, the DSC 106 analyzes the slot allocation information in an MMC3 provided from the PC-A 101 to detect the coupling request notification slot DNTSB3 (S34, P4). Then, the DSC 106 transmits the coupling request to the PC-A 101 by using the detected coupling request notification slot DNTSB3 (S35, P5).

When receiving the coupling request from the DSC 106 (P6), the PC-A 101 displays information indicating the DSC 106 (a device name and the like) in the device list display region 37 on the multi-host environment setting screen 35.

Then, when the DSC 106 displayed in the device list display region 37 is selected and the coupling permission button 38 is pressed by a user's input operation in the PC-A 101 (S36, P7), the PC-A 101 performs generation and allocation of a transmission/reception slot transmitting/receiving data (a message) between the PC-A 101 and the DSC 106. Accordingly, as depicted in FIG. 9, post-coupling processing notification slots DNTSA4 and DNTSA5 and transmission/reception slots RSSB4 and RSSB5 for the DSC 106 are provided from the PC-A 101 (S37).

The DSC 106 analyzes the slot allocation information in an MMC4 and an MMC5 provided from the PC-A 101 to detect the transmission/reception slots RSSB4 and RSSB5 (P8, P10). Then, the DSC 106 transmits/receives data (a message) to/from the PC-A 101 by using the detected transmission/reception slots RSSB4 and RSSB5 (P9, P11). For example, data (a message) is transmitted/received between the PC-A 101 and the DSC 106 by using the transmission/reception slots RSSB4 and RSSB5, and thereby, authentication processing and configuration processing in conformity with the wireless USB standard are executed (S38).

Further, the above-described embodiment is to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

Note that in order that the device couples to the targeted host device being a communication object under the multihost environment where the plural host devices exist in a narrow range, it may be also possible that the device lists host identification information from the detected device notification slot to display it, and a user selects the host device being a communication object from the displayed list. Further, it may be also possible that the device does not list the connectable host device but performs the coupling request to the host device in the order in which the detected device notification slot is detected. Further, the host device mounts a mechanism capable of rejecting the coupling request transmitted from the device therein, and thereby erroneous coupling may be prevented as well.

Aforementioned embodiments may be applied to wireless communication devices and a wireless communication method, in wireless communication in which wireless radio waves are used and a slot is allocated in a time division manner thereby performing communication.

As described above, according to any of the embodiments, as a first slot transmitting notification from an electronic device to a host device, a second slot transmitting a coupling request and a third slot transmitting notification except the coupling request are provided, and provision of the second slot may be controlled, and thereby it may become possible to control a period allowing the coupling request to be performed, prevent the host device and the electronic device from being coupled erroneously, and connect the host device being a communication object and the electronic device appropriately.

Any of the aforementioned embodiments may control a period allowing a coupling request to be performed, prevent a host device not being a communication object and a device from being coupled erroneously, and couple the host device and the device appropriately.

According to any of the aforementioned embodiments, the second slot transmitting the coupling request as the first slot is provided separately and whether or not to provide the second slot is controlled, and thereby it makes it possible to control a period in which the second slot is provided, prevent the host device not being a communication object and the electronic device from being coupled erroneously by the unintended coupling request, and connect the host device being a communication object and the electronic device.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

What is claimed is:

1. A wireless communication device allocating a slot that indicates a given communication period in a time division manner and transmitting slot allocation information in which allocation of the slot is defined, the wireless communication device comprising:
    an information generation processing part to generate the slot allocation information of each slot including notification slots for transmitting notification from an electronic device to the wireless communication device,
    a transmission or reception part to transmit the slot allocation information generated in the information generation processing part,
    a controller to control whether or not to provide a first device notification slot;
    wherein the notification slots include the first device notification slot for transmitting a coupling request to the wireless communication device and a second device notification slot for transmitting notification to the wireless communication device except the coupling request; and wherein
    in the case when an environment setting is in a first state and a coupling instruction is not input, provision of the first device notification slot is stopped, and
    in the case when the environment setting is in the first state and the coupling instruction is input, the first device notification slot is provided.

2. The wireless communication device according to claim 1, wherein
    after the coupling instruction is input, the second first device notification slot is provided during a given period.

3. The wireless communication device according to claim 1, wherein
    the first state is a state where a communication range formed by wireless radio waves output from the wireless communication device and a communication range formed by wireless radio waves output from another wireless communication device have an overlapped region.

4. The wireless communication device according to claim 1, wherein
    in the case when the environment setting is in a second state, the second first device notification slot is provided periodically.

5. The wireless communication device according to claim 4, wherein
    the second state is a state where the communication range formed by the wireless radio waves output from the wireless communication device is independent from a communication range formed by wireless radio waves output from another wireless communication device.

6. The wireless communication device according to claim 1, further comprising:
    a coupling management part to manage a coupling state to the electronic device; and
    wherein the information generation processing part performs generation and allocation of the slot and generates the slot allocation information in accordance with coupling control information from the coupling management part.

7. The wireless communication device according to claim 6, wherein
    the transmission or reception part transmits or receives information to or from the electronic device during the slot.

8. The wireless communication device according to claim 6, wherein the information generation processing part switches whether or not to generate the first device notification slot in accordance with the coupling control information.

9. The wireless communication device according to claim 6, wherein
the information generation processing part does not generate the first device notification slot in the case when the environment setting is a multi-host environment and
in the case when the environment setting is the multi-host environment and the coupling instruction is input, the information generating processing part generates the first device notification slot during a given period after the coupling instruction is input.

10. The wireless communication device according to claim 9, wherein
the electronic device that receives the coupling request by the first device notification slot is list-displayed on a display part.

11. The wireless communication device according to claim 6, wherein
the information generation processing part generates the first device notification slot periodically in the case when the environment setting is a single host environment.

12. The wireless communication device according to claim 1, wherein
communication is performed in conformity with a wireless USB standard.

13. A wireless communication device allocating a slot that indicates a given communication period in a time division manner and communicating with a host device based on slot allocation information in which allocation of the slot is defined, the wireless communication device comprising:
a transmission or reception part to receive the slot allocation information,
an information analysis processing part to analyze the received slot allocation information to determine whether or not a first device notification slot exists based on an analysis result; and wherein
device notification slots to transmit notification to a host device and to enable allocation of the first device notification slot for transmitting a coupling request and a second device notification slot for transmitting notification except the coupling request, and
when the wireless communication device requests coupling to the host device, and in the case when the first device notification slot exists as a result of analysis by the information analysis processing part, the transmission or reception part transmits the coupling request by the first device notification slot; and wherein
in the case when an environment setting is in a first state and a coupling instruction is not input, provision of the first device notification slot is stopped, and
in the case when the environment setting is in the first state and the coupling instruction is input, the first device notification slot is provided.

14. A wireless communication method allocating a slot that indicates a given communication period in a time division manner and transmitting slot allocation information in which allocation of the slot is defined, the method comprising:
performing generation and allocation of the slot based on an environment setting and generating the slot allocation information;
transmitting the generated slot allocation information to an electronic device, and wherein
notification slots for transmitting notification from the electronic device to the wireless communication device include a first device notification slot for transmitting a coupling request and a second device notification slot for transmitting notification except the coupling request, and
when generating the slot allocation information, whether or not to generate the first device notification slot is switched in accordance with the environment setting, wherein
when generating the slot allocation information, the first device notification slot is not generated in the case when the environment setting is a multi-host environment and a coupling instruction is not input, and
the first device notification slot is generated during a given period in the case when the environment setting is the multi-host environment and the coupling instruction is input.

15. The wireless communication method according to claim 14, wherein
when the generating the slot allocation information, the first device notification slot is generated periodically in the case when the environment setting is a single host environment.

* * * * *